US005117503A

United States Patent [19]

Olson

[11] Patent Number: 5,117,503

[45] Date of Patent: May 26, 1992

[54] DIRECTIONAL ANTENNA ARRANGEMENT METHOD FOR SIMULCAST BROADCASTING

[75] Inventor: Carl B. Olson, San Carlos, Calif.

[73] Assignee: Motorola, Inc., Schaumburg, Ill.

[21] Appl. No.: 415,799

[22] Filed: Oct. 2, 1989

[51] Int. Cl.[5] .......................... H01Q 3/00; H04B 7/005

[52] U.S. Cl. .......................... 455/51.1; 342/359; 375/107; 455/33.1; 455/67.1

[58] Field of Search .......................... 455/50-52, 455/56, 55, 33, 67; 371/5.4; 375/107; 342/359, 360, 423, 432

[56] References Cited

U.S. PATENT DOCUMENTS 4,249,181 2/1981 Lee .......................... 455/33
4,255,814 3/1981 Osborn .......................... 455/51
4,633,463 12/1986 Mack .......................... 370/95
4,972,410 11/1990 Cohen et al. .......................... 455/51

*Primary Examiner*—Reinhard J. Eisenzopf
*Assistant Examiner*—Chi H. Pham
*Attorney, Agent, or Firm*—Joseph P. Krause; Steven G. Parmelee; Anthony J. Sarli

[57] ABSTRACT

A method of configuring directional antennas to more fully radiate a geographic region serviced by a simulcast radio system can reduce the number of omni-directional antennas used by prior art methods. Directional antennas having significant differences between frontal and rearward radiated signal levels are used to provide large signal amplitude differences when signal phase differences in the simulcast coverage area become appreciable.

9 Claims, 3 Drawing Sheets

FIG. 1
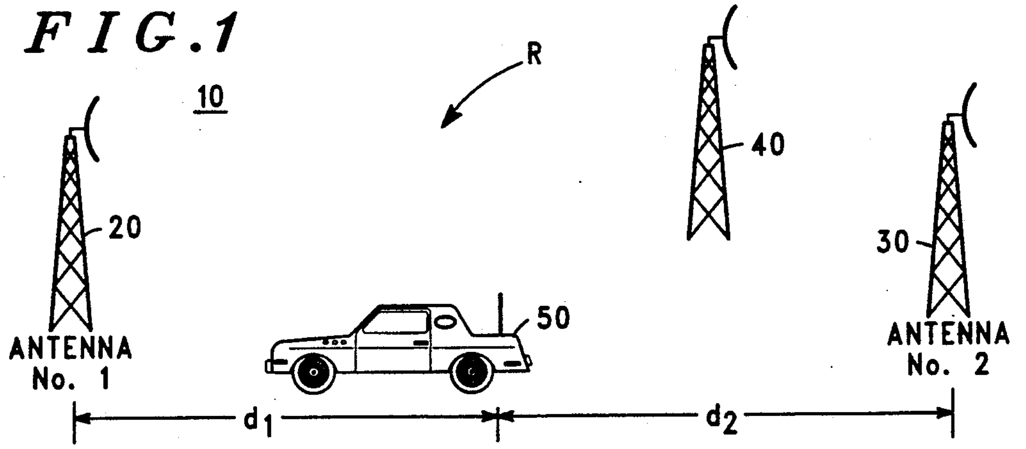
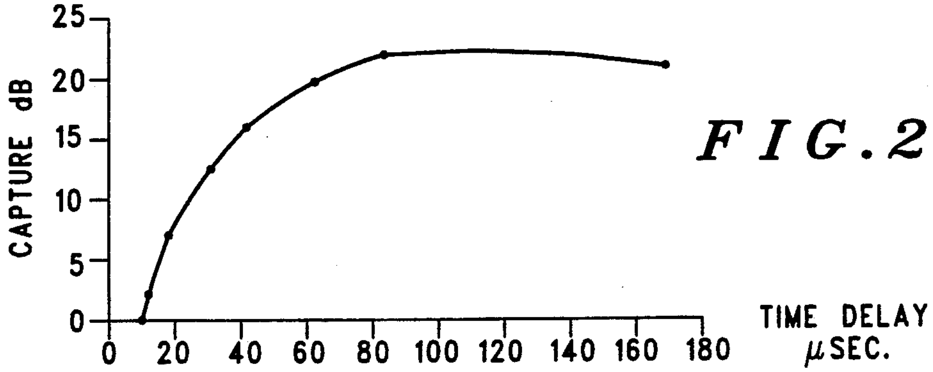
FIG. 2
FIG. 3
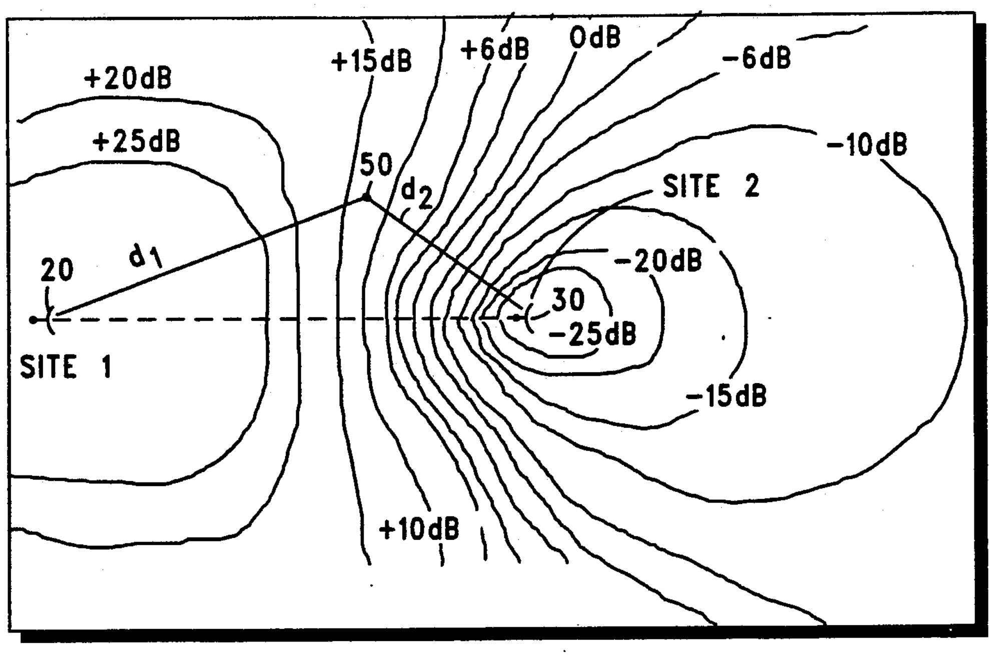

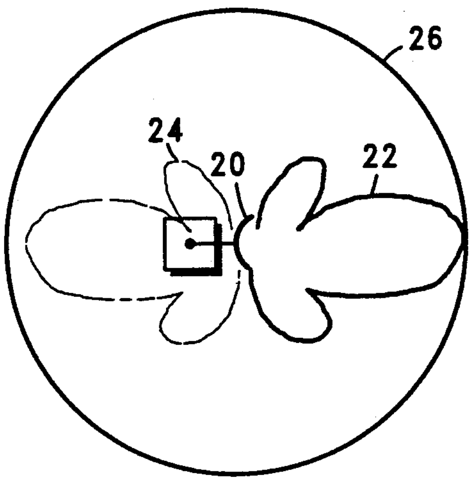
FIG. 4
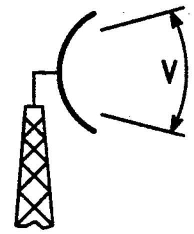
FIG. 5
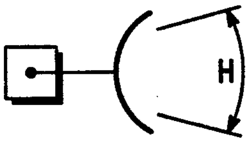
FIG. 6
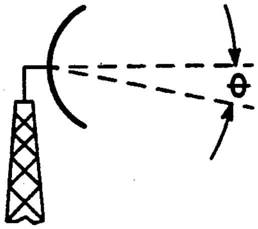
FIG. 7
FIG. 8
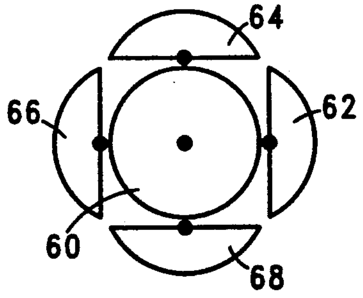
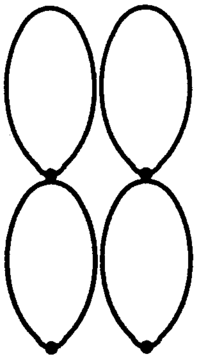
FIG. 9
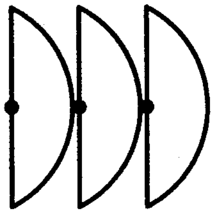
FIG. 10

DIRECTIONAL ANTENNA ARRANGEMENT METHOD FOR SIMULCAST BROADCASTING

BACKGROUND OF THE INVENTION

This invention relates to antenna system. In particular, this invention relates to antenna systems used for simulcast communication systems.

Simulcast communication systems expand communications coverage in a geographic region by using multiple antennas with radio transmitters at each antenna to simultaneously or nearly simultaneously broadcast a program signal from each antenna that originates from a program source distant from the antennas. A problem with simultaneously broadcasting a program signal from separate radio transmitters at separate antennas occurs when a receiver receives signals from more than one antenna. Signals at a receiver from different antennas that are out-of-phase at the receiver makes demodulation of the signals difficult.

When voice or analog signals are simulcast from multiple antennas, simulcast system designers must minimize modulation differences between transmitter sites and must minimize phase differences throughout the geographic region of coverage by positioning transmitting stations and antennas appropriately. In many cases, time delays must be added to a signal for broadcast to insure that signals from different antennas do not destructively combine at some point within the geographic region.

When digital signals, such as binary data or digitized voice, are simulcast from multiple antennas, phase differences between signals received from multiple antennas present a critical problem. Since digital signals are susceptible to additive and destructive wave interference, the requirements of phasing and amplitude equalization of signals broadcast from multiple antennas becomes even more critical. Digital signals from multiple transmitters that are out of phase at a receiver may render data unrecoverable by a receiver. Bit errors that occur in demodulating a digital signal that are caused by a receiver unable to discriminate against other signals increase a phase differences between signals from two or more simulcast antenna sites increase and magnitude differences between the RF signals decrease.

Prior art digital simulcast systems typically increase the number of transmitting sites in a geographic region to insure that virtually no area in a geographic region of coverage is without an RF signal from at least one transmitting site that is sufficiently large in amplitude with respect to other signals to overcome phase differences between RF signals received from other transmitting sites located elsewhere in the region. Increasing the number of transmitter sites, however, to insure accurate demodulation and accommodate increasing data rates becomes prohibitively expensive, complex, and decreases overall system reliability. An antenna system specifically for use with digital data simulcast networks that reduces the need for multiple antenna sites while increasing the reliability of the communication system would be an improvement over the prior art.

SUMMARY OF THE INVENTION

There is provided herein a method of optimally locating antennas for digital simulcast communication system wherein antennas and delay elements provide improved communication coverage to a geographic area. The method presumes that there are at least two antennas or transmission sites from which an information signal that originates from some other location is broadcast. The information signal is transmitted to the transmission sites where it modulates a transmitter at the transmission sites.

The method requires that signal strengths of the signals from the transmission sites are measured throughout the simulcast area. The relative arrival times of signals from the various transmission sites at various point in the simulcast are also measured.

After the equal signal level point is identified a time delay factor required by one transmission site to cause signals from the transmission sites to arrive at the equal level signal level point at substantially the same time is calculated. A time delay element providing this time delay is added to the appropriate transmission site. After the addition of this time delay element, signals from the transmission sites are substantially in phase and of equal amplitude at the equal signal level point. Thereafter, radiation patterns of the antennas at the transmission sites are adjusted such that at various points in the simulcast area, signals from the transmission sites, if out-of-phase, are of sufficiently different magnitude to permit reliable detection and demodulation by a receiver throughout the simulcast geographic area. Omni-directional antennas can also be used in combination with directional antennas to widen the area of coverage.

BRIEF DESCRIPTION OF THE DRAWINGS

FIG. 1 shows a schematic drawing of a simulcast system and a receiver.

FIG. 2 shows a graph of the signal amplitude difference required between two signals having a particular arrival time difference at a receiver to achieve a bit error rate of less than or equal to one percent.

FIG. 3 shows a topographical view of two antennas of a simulcast system and a receiver.

FIG. 4 shows a topographical view of a directional antenna the front radiation pattern and the backward radiation pattern.

FIG. 5 shows a side view including the vertical half power beam width of the antenna.

FIG. 6 shows a top view in the horizontal beam width radiation pattern.

FIG. 7 shows a side view of an antenna at a tilt angle of the antenna.

FIG. 8 shows one pattern of an omni-directional and four directional antennas.

FIG. 9 shows a pattern of directional antennas.

FIG. 10 shows a linear pattern of directional antennas.

DETAILED DESCRIPTION OF THE PREFERRED EMBODIMENT

Figure 11:
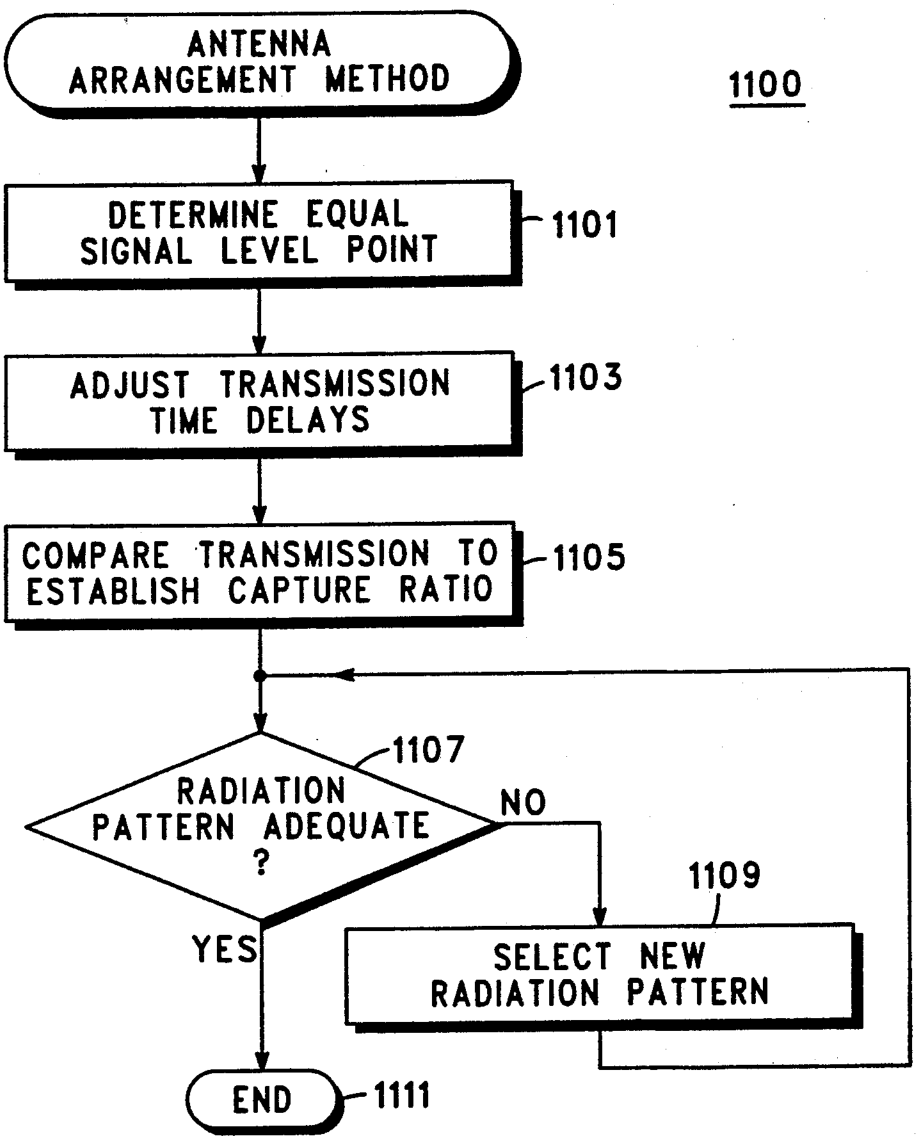
FIG. 11 shows a flow diagram depicting an antenna arrangement method, in accordance with one embodiment of the present invention.

Referring to FIG. 1, there is shown a simulcast system (10) that has three antennas (20, 30 and 40), each of which would typically have an associated transmitter (not shown) that comprises a transmission site. A receiver (50), which could be a mobile radio, a cellular telephone or other similar device in an automobile for example, is positioned at some predetermined location X where it receives signals from the first antenna (20) as well as the second antenna (30). The receiver at point X is located some distance d1 from antenna 1 and a second distance d2 from antenna 2.

RF signals broadcast from the three antennas (20, 30 and 40) are from the transmitters (not shown), modulated by an information signal that originates from some common programming source (not shown). This programming source information signal is transferred to separate transmitters at each antenna (20, 30 and 40) which modulates the transmitters to provide the signal that is broadcast from the antennas. The programming source information signal might be transferred to the antennas by microwave, telephone lines, or other suitable medium.

In the preferred embodiment, data from the program source is digital data and certain precautions must be taken in the modulation of the transmitters at the antennas and the placement of the antennas to insure that the data from the program source can be coherently demodulated by the receiver (50) regardless of its location in the geographic region denoted as R. These precautions include insuring that signal levels received by the receiver (50) are sufficiently great when arrival times of signals from different antennas and transmitters could tend to degrade demodulation of the digital signal. (This would typically be caused by two digital signals of the same information arriving slightly out-of-phase with respect to each other.)

FIG. 3 shows a topographical plot of calculated data showing the expected signal level difference between two signals arriving at a receiver (50) within the simulcast system (10) shown in FIG. 1. The calculations plotted in FIG. 3 account for radiation patterns from the antennas, as well as terrain contours. (A computer program predicts by a model, the propagation of an RF signal in the geographic region, accounting for antenna and terrain variations. Such computer programs are available from the National Bureau of Standards or other publications.) Computer models of propagation in a geographic region also calculate arrival time differences between signals from the antennas at a receiver (50) virtually anywhere in the geographic region.

Having made calculations of arrival time differences and signal levels throughout the region, these calculated signal levels and arrival time differences are compared against an empirically derived relationship between these two parameters which should be met by the simulcast system to insure a digital signal bit error rate at a receiver in the region at less than some desired amount. The desired bit error rate is user defined and will vary depending upon the accuracy required of the data being received by the receiver (50). If the arrival time differences and signal lvels for all locations throughout the geographic region comply with the criteria of FIG. 2, the antenna radiation patterns and locations of the model should produce a real simulcast transmission system with a bit error rate of less than the user-defined amount throughout the geographic region. If the calculated arrival time differences and signal level differences do not match the criteria of FIG. 2, antenna characteristics are modified in the model and the computer evaluation is repeated using the modified antenna characteristics.

When a computer simulation of the arrival time differences and signal level differences satisfy the criteria of FIG. 2, the actual antennas are constructed. Actual field measurements of arrival times and signal levels should thereafter be made to confirm the computer model and the antenna selections.

FIG. 2 shown a plot of the required signal level difference between two digital signals required to produce a bit error rate of 1% or less in the demodulation of the data as chosen in the preferred embodiment. Other bit error rates could be more or less stringent.

Referring to FIG. 2, if the delay time between two signals is 40 microseconds, to demodulate these two signals with a bit error rate of 1% or less, the two signals must have a means signal amplitude difference of approximately 15 dB or greater. If the signal amplitude level difference falls below 15 dB, with the arrival time difference of 40 microseconds, the bit error rate is likely to exceed 1%, increasing as the signal level difference decreases.

In the modeling of the simulcast system the determination of the placement and type of antenna in a simulcast system as contemplated by the present invention is made by first determining the point between two antennas in a simulcast system where signal levels broadcast between the two antennas are of equal amplitude. This equal signal level point between two antennas may vary with antenna height and antenna design as well as the terrain of the geographic area between the two antennas.

After the equal signal level point between two antennas is determined, the arrival time of the two signals from the two antennas at the equal signal level point with respect to each other must be calculated using any appropriate model. A time delay factor, required to insure that signals from the two antennas arrive at the equal signal level point at the same time is calculated, and this time delay is added to the appropriate signal distribution path from the information source to the antennas. (The time delay will usually be added to the transmission path coupled to the antenna closest to the equal signal level point.) This delay factor added to the closest antenna insured that the broadcast signal (the signal modulating the transmitters at the antennas) arrives at the equal signal level point at precisely or substantially the same instant in time. A receiver at the equal signal level point is assured thereby that signal arriving at this equal signal level point arrive in phase with respect to each other. This insures that there is virtually no possibility of incorrect demodulation of the digital data.

After the amount of delay required to phase synchronize signals from the two antennas at the equal signal level point is added to the closest antenna signal path, signal strength calculations through substantial portions of the geographic region of coverage and the arrival times of the signals at these points are made. Using the criteria established in FIG. 2, the signal levels from the respective antennas must be selected such that differences in the signal level at substantially all points in the geographic region satisfy the criteria of FIG. 2 for the arrival time difference between the two signals at the particular point. The radiation pattern of the antennas is preferably adjusted by selecting directional antennas and adjusting radiation patterns to insure that the requirements of the graph of FIG. 2 is met throughout the region R.

It should be pointed out that the criteria in FIG. 2 is established empirically and may change for different data rates and different bit error rates. If after performing the foregoing computer optimization the actual simulcast system does not satisfy the criteria of FIG. 2 in certain areas of the geographic region, adjustments of time delay to the transmission paths serving the antennas and radiation patterns may be necessary.

In one embodiment, directional antennas having front to back signal strength ratios of up approximately 25 dB were used in various configurations. FIG. 4 shows a hypothetical antenna (20) with a frontal radiation pattern (22), a backward radiation pattern (24) and an omnidirectional radiation pattern (26). For optimum directional antennas the signal strength for the frontal radiation pattern (22) should be 25 dB or greater in the frontal radiation pattern than the rearward radiation pattern (24) as compared to the omnidirectional antenna radiation pattern (26), which does not vary with direction from the antenna (20).

FIG. 8 shows an omni-directional antenna (60) with a circular radiation pattern, substantially surrounded by directional antennas (62, 64, 66 and 68). The directional antennas might be similar to the antenna shown in FIG. 4. Additional direction antennas might encircle the circular radiation pattern from the omni-directional antenna (60) possibly between the directional antennas as shown. Using a single omni-directional antenna and four directional antennas the range of coverage to the geographic area can be substantially increased at substantially reduced costs as compared to using entirely omni-directional antennas.

FIG. 9 shows an alternate configuration using four omni-directional antennas to radiate a geographic area. A virtually rectangular geographic region can be communicated with by means of four directional antennas spaced to provide optimum signal coverage using the method described above.

FIG. 10 describes yet another alternate way of positioning directional antennas in the linear array to increase signal coverage in another area.

Alternate considerations in the antenna design would include adjusting the vertical height beam width or half power beam width of an antenna limiting its effective area of radiation. FIG. 5 shows an angular displacement of V describing the half power vertical beam width.

Similarly, the horizontal half power beam width denoted in FIG. 6 by the angular displacement H affects the range of coverage of the antenna.

In FIG. 7, the mechanical forward tilting of an antenna or the electrical tilting of an antenna is adjusted by an angle Theta to limit the geographic range of coverage of the antenna.

Referring again to FIG. 3, the placement of the antennas (20 and 30) or their location might be changed if the radiation pattern could not be adjusted to provide adequate signal levels for corresponding signal arrival time differences to satisfy the criteria of FIG. 2. If antenna radiation patterns and placement of two antennas would not provide radio coverage in a geographic region to satisfy the criteria of FIG. 2, an alternate solution would be the inclusion or addition of yet another antenna or antennas in the geographic region to insure that signal level differences between multiple signals arriving at a receiver at slightly different times, are sufficiently great to insure that a receiver can coherently demodulate the signal.

FIG. 11 shows a flow diagram depicting a preferred sequence of steps to employ the present invention. In particular, an antenna arrangement method (1100) describes how the aforementioned techniques may be used to optimize signal reception in a communications system, such as the simulcast system (10) shown in FIG. 1. An equal signal level point is determined (1101), which point is used to calibrate the transmissions from two or more transmitter sites. The transmissions at the respective sites are adjusted (1103) by adding time delays to the appropriate signal distribution path, as earlier described. Once adjusted, an actual capture ratio is established (1105) and compared to an empirically derived relationship for a desired bit error rate. This comparison is used to determine (1107) whether or not the current radiation pattern emanating from the antennas is sufficient to accomplish the desired bit error rate. If sufficient (e.g. actual capture ratio is equal to or better than the empirically derived curve of FIG. 2), the antennas are constructed using the prescribed configuration, and the arrangement is complete (1111). If the capture ratio is deemed to be insufficient to ensure the desired bit error rate (e.g. actual capture ratio falls below the curve of FIG. 2), a new radiation pattern is selected (1109), and the capture ratio is again measured. This process continues until a capture ratio is established which meets or exceeds the required relationship set forth in FIG. 2). It should be noted that the antenna arrangements selected may include any of the aforementioned configurations. Namely, a directional radiation pattern with selective horizontal and vertical half-power beam widths, power gain ratios, electrical down-tilt, and mechanical down-tilt are contemplated.

What is claimed is:

1. In a simulcast antenna system covering a geographic area having at least a first and second transmission site and source site for sourcing a digital information signal, a method of improving reception coherence, comprising the steps of:

A) determining an equal signal level point of transmissions from the first and second transmission site;

B) adjusting at least one of the transmissions from the first and second transmission sites to cause a transmission of the information signal from the first transmission site to arrive at the equal signal level point at substantially the same time as a transmission of the information signal from the second transmission site;

C) comparing transmissions from the first transmission site with transmissions from the second transmission site at various points within the geographic area, to thereby measure at least one reception parameter;

D) selecting a signal radiation pattern for at least one of the first and second transmission sites to optimize the at least one reception parameter.

2. The method of claim 1 where said at least one reception parameter is an empirically determined required relationship between relative signal strengths and signal arrival times at various points to insure that the digital information signal, after reception by a receiver in said geographic region, has a maximum allowable bit error rate.

3. The method of claim 2 including the step of adding a transmission site within said geographic region to meet said empirically determined required relationship.

4. The method of claim 3 including the step of relocating a transmission site within said geographic region to meet said empirically determined required relationship.

5. The method of claim 3 further comprising the step of selecting a directional radiation pattern for said transmission sites.

6. The method of claim 5 where the step of selecting a directional radiation pattern for said transmission sites includes the step of selecting the horizontal and vertical half-power beam widths of said transmission sites.

7. The method of claim 5 where the step of selecting a directional radiation pattern for said transmission sites includes the step of selecting the ratio of the forward power gain to the reverse power gain of the antennas.

8. The method of claim 5 where the step of selecting a directional radiation pattern for said transmission sites includes the step of selecting the electrical down-tilt of the antennas.

9. The method of claim 5 where the step of selecting a directional radiation pattern includes the step of selecting the mechanical down-tilt of the antennas.

* * * * *